Jan. 11, 1938. L. L. CUNNINGHAM 2,104,972
MOTOR CONTROL SYSTEM
Filed July 19, 1935
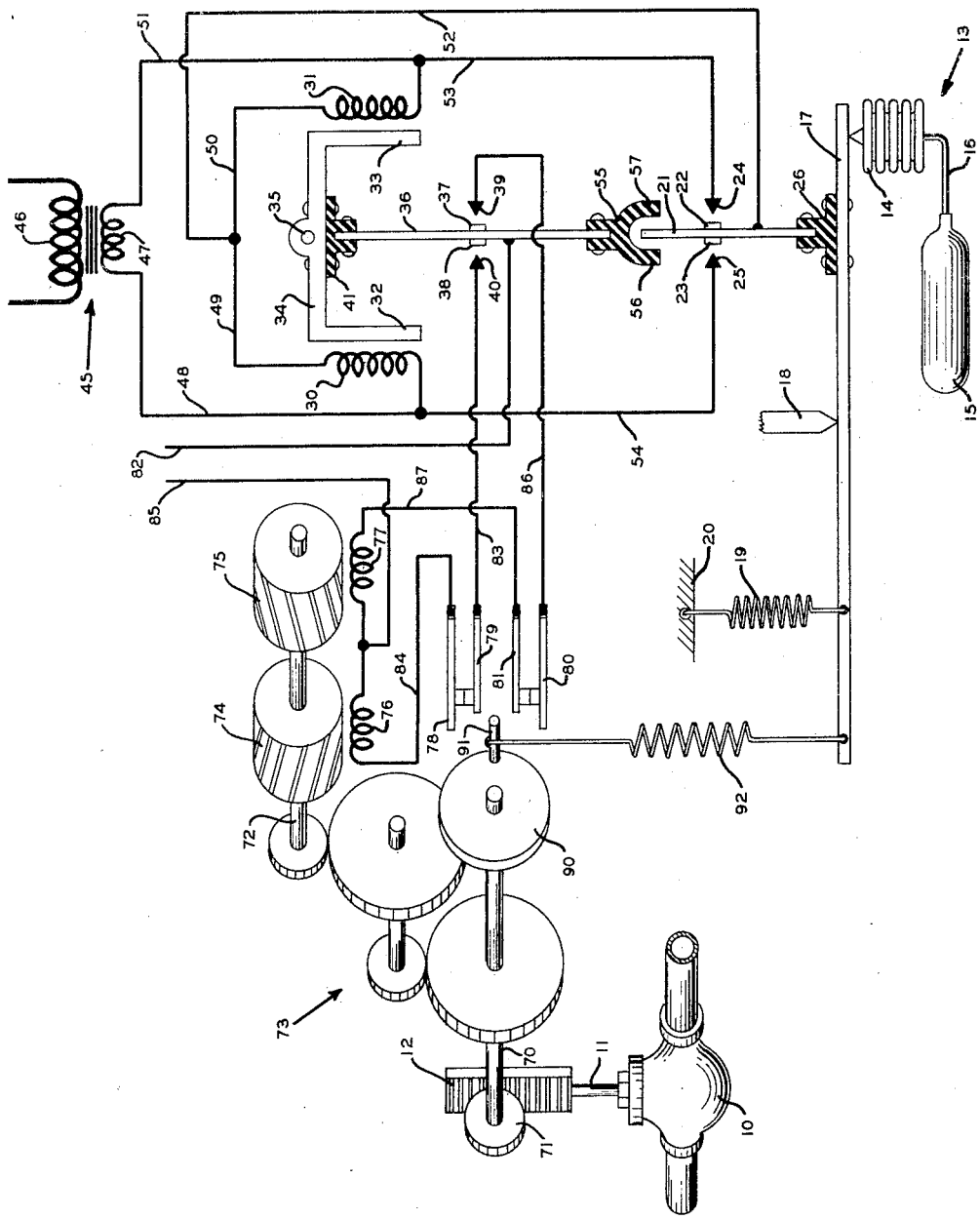
Inventor
Lewis L. Cunningham
By George H Fisher
Attorney Patented Jan. 11, 1938

2,104,972

UNITED STATES PATENT OFFICE 2,104,972

MOTOR CONTROL SYSTEM

Lewis L. Cunningham, Minneapolis, Minn., assignor to Minneapolis-Honeywell Regulator Company, Minneapolis, Minn., a corporation of Delaware Application July 19, 1935, Serial No. 32,224

11 Claims. (Cl. 172—239)

The present invention relates to those systems wherein it is desired to position a device in accordance with the movements of a controlling member.

One of the objects of the present invention is the provision of a graduated control system of the electrical type in which a single electromagnetic means operates both to control a switch in control of the electrical motor means of the graduated control system and to firmly hold closed a switch which controls such electromagnetic means.

More specifically, the invention comprehends a system wherein a switch is controlled in any manner by the conjoint action of an electrical motor means and a controlling member, this switch in turn controlling electromagnetic means which not only controls the energization of the motor means but also operates upon its own controlling switch so as to hold the same firmly closed.

A further object of this invention is the provision of a graduated control system in which a controlling switch is controlled by the conjoint action of a variable controlling force and a variable balancing force, the variable balancing force being controlled by electric motor means which positions a device to be controlled and is in turn controlled by said controlling switch.

Preferably, the variable controlling force is a variable pressure, such as steam pressure or the pressure generated in a fluid thermostat, and the balancing force is in the form of a spring. Also, in the preferred form, the above mentioned contact pressure increasing method it utilized.

Other objects reside in the various combinations and sub-combinations illustrated in the drawing and contained in the detailed description and appended claims.

For a more complete understanding of the invention, reference may be had to the following description and accompanying single drawing which is a diagrammatic illustration of one embodiment of my invention.

Referring to the single drawing, the device to be controlled is herein illustrated as a valve 10 that is provided with a valve stem 11 which is connected to a rack 12. The variable controlling force, in accordance with which it is desired to position the valve 10, is herein disclosed as a variable pressure which may be obtained from any source or in any desired manner but in the particular embodiment of the invention disclosed in this application, the variable source of pressure is shown as being obtained from a volatile fluid thermostat 13. This thermostat comprises a bellows 14, controlling bulb 15 and connecting tube 16. As is well-known in the art, the temperature to which the controlling bulb 15 is subjected causes variable vapor tension to be maintained within the bellows 14, tube 16 and control bulb 15, all these parts being charged with the proper amount of volatile fluid suitable for the temperatures to which the thermostat 13 is to respond. The bellows 14 acts upon a control arm 17 which is pivoted as indicated at 18. A main spring 19 has one of its ends connected to the control arm 17 and its other end connected to a suitable support 20 and acts in opposition to the pressure created within the thermostat 13 so as to counter-act the same.

A first double-circuit switching means comprises a flexible arm 21 that carries a pair of contacts 22 and 23 which respectively cooperate with a pair of associated contacts 24 and 25. This switch arm 21 is controlled by the control arm 17 and is herein shown as being directly connected thereto through the medium of a block of insulating material 26.

This first switching mechanism controls a balanced relay that comprises similar relay coils 30 and 31 which respectively cooperate with the legs 32 and 33 of an armature 34 which is pivoted at 35. This armature 34 controls a second switching mechanism that comprises a flexible switch arm 36 that carries contacts 37 and 38. These contacts 37 and 38 respectively cooperate with contacts 39 and 40. It will be evident that if the relay coil 30 is sufficiently more highly energized than the relay coil 31, the armature 34 will rotate counter-clockwise and move contact 37 into engagement with contact 39. Similarly, if the relay coil 31 is sufficiently more highly energized than relay coil 30, the contact 38 will be moved into engagement with contact 40.

The energizations of relay coils 30 and 31 are controlled by the first switching mechanism comprised by the contacts 22, 23, 24 and 25. The control of the energization of relay coils 30 and 31 by these contacts may be obtained in any desirable manner but is herein shown as being obtained by having both of these relay coils normally equally energized and by then short-circuiting one or the other of them. For this purpose, power is supplied to these coils by a step-down transformer 45 having a high voltage primary 46 and a low voltage secondary 47. The relay coils 30 and 31 are connected in series across this secondary 47 by a circuit as follows: secondary 47, wire 48, relay coil 30, wire 49, wire 50, relay coil 31 and wire 51 to the other side of secondary 47. When the relay coils 30 and 31 are thus equally energized, it will be evident that the armature 34 will assume the intermediate position shown in the drawing wherein the switch arm 36 extends straight downwardly. In order to control the operative energizations of relay coils 30 and 31 by the first switching mechanism, the switch arm 21 is connected to the junction of wires 49 and 50 by a wire 52. The contact 24 is connected to the lower end of relay coil 31 by a wire 53 and the contact 25 is connected to the lower end of relay coil 30 by a wire 54. It will therefore be evident that upon movement of switch arm 21 to the left sufficiently to bring contact 23 into engagement with contact 25, the relay coil 30 will be short-circuited by wire 49, wire 52, switch arm 21, contact 23, contact 25, and wire 54. Similarly, upon movement of switch arm 21 to the right sufficiently to move contact 22 into engagement with contact 24, the relay coil 31 will be short-circuited by wire 50, wire 52, switch arm 21, contact 22, contact 24, and wire 53. In this manner, engagement of contact 23 with contact 25 causes operative energization of relay coil 31 by short-circuiting relay coil 30 whereupon switch arm 36 is rotated in a manner to bring contact 38 into engagement with contact 40. On the other hand, engagement of contact 22 with contact 24 operatively energizes relay coil 30 by short-circuiting relay coil 31 whereupon contact 37 moves into engagement with contact 39.

In order to eliminate vibration between the contacts 22 and 24 or contacts 23 and 25 and in order to cause a good firm contact pressure to be established between these contacts upon the lightest engagement thereof, the switch arm 36 carries a fork of insulating material at its lower end, designated 55. The fork 55, switch arm 21, switch arm 36 and contacts 39 and 40 are so positioned and arranged that the left hand prong 56 of the fork 55 engages the switch arm 21 slightly prior to engagement of contact 37 with contact 39. On the other hand, the prong 57 of the fork 55 engages the switch arm 21 on its other side just prior to engagement of contact 38 with contact 40. In this manner, operative energization of the relay coils 30 and 31 not only causes engagement of the respective sets of contacts 37—39 and 38—40 but also either causes contact 22 to be more firmly pushed into engagement with contact 24 or contact 23 to be held more firmly in engagement with contact 25 whereby the relay mechanism comprised by the relay coils and associated armature serves the dual function of controlling a switching mechanism and increasing the contact pressure of the switching mechanism which controls this same relay mechanism.

The valve 10 is driven by a motor mechanism that includes a main shaft 70 which is provided with a pinion 71 that cooperates with the rack 12. This main shaft 70 is coupled to a rotor shaft 72 through a suitable gear reduction indicated generally at 73. Mounted upon rotor shaft 72 is a pair of induction motor rotors 74 and 75 with which field windings 76 and 77, respectively cooperate. The energizations of field windings 77 and 76 are respectively controlled by the sets of contacts 37—39 and 38—40. They are also controlled by a pair of limit switches the first of which comprises a switch arm 78 and a switch arm 79 and the second of which comprises a switch arm 80 and a switch arm 81. The circuit for field winding 76 is as follows: line wire 82, switch arm 36, contact 38, contact 40, wire 83, switch arm 79, switch arm 78, wire 84, field winding 76 and line wire 85. The circuit for field winding 77 is as follows: line wire 82, switch arm 36, contact 37, contact 39, wire 86, switch arm 80, switch arm 81, wire 87, field winding 77 and line wire 85.

It will be readily apparent that an increase in the pressure in the thermostat 13 causes movement of contact 23 into engagement with contact 25 whereas a decrease of pressure within this thermostat causes contact 22 to engage contact 24. In order to obtain a graduated control, it is necessary to provide some means of causing the switch arm 21 to return to its normal central position. One of the features of this invention is the manner in which this is accomplished. It will be noted that the main shaft 70 of the motorized control mechanism carries a disc 90 that is provided with a crank pin 91. This crank pin is connected to one end of a spring 92 which has its other end connected to the control arm 17. If this disc 90 is rotated in clockwise direction, as viewed from the right, the tension of spring 92 is reduced whereby the pressure in the thermostat 13 is effective to move the right hand end of control arm 17 upwardly. If, on the other hand, the disc 90 is rotated in a counter-clockwise direction, as viewed from the right, the tension of spring 92 is increased and the right hand end of control arm 17 is moved downwardly against the pressure within the thermostat 13. This same crank pin 91 operates to engage switch arm 78 and switch arm 80 so as to move these limit switches to open position when the crank pin 91 has rotated a quarter revolution in either direction from the position in which it is shown.

With the parts in the position shown, the temperature to which the control bulb 15 is subjected is at the desired value, the switch arm 21 is in an intermediate position wherefore neither of the relay coils 30 or 31 is short-circuited so that switch arm 36 is in an intermediate position. Field windings 76 and 77 are therefore both deenergized. The valve 10 is in a half open position. If the temperature to which thermostat 15 now responds should rise, the right hand end of lever 17 will be moved upwardly against the tension of main spring 19 and balancing spring 92 and switch arm 21 will move to the left. When this increase in temperature is sufficient, contact 23 will be moved into engagement with contact 25. Relay coil 30 will thereupon be short-circuited as heretofore explained so that armature 34 will rotate in a clockwise direction. Just before contact 38 engages contact 40, the prong 57 of fork 55 engages the right hand side of switch arm 21 and presses contact 23 more firmly into engagement with contact 25. Instantly that this occurs, the contact 38 is moved into engagement with contact 40 and held in such firm engagement by the action of relay coil 31 which is now operatively energized. Engagement of contacts 38 and 40 energizes field winding 76 by the circuit hereinbefore described whereupon rotor 74 drives the main operating shaft 70, through the reduction gearing 72, in a counter-clockwise direction as viewed from the right whereupon the valve 10 is opened more widely. The valve 10, for instance, may well control the flow of cooling medium to some device which influences the thermostat 13. This counter-clockwise rotation of main operating shaft 70 causes the crank pin 91 to be moved upwardly so that more tension is placed in spring 92. This additional tension counteracts the increased pressure built up in thermostat 14 whereupon arm 17 is returned to its horizontal position and contact 23 disengages contact 25. The short circuit for relay coil 30 is thereupon interrupted so that both relay coils 30 and 31 are again equally energized whereupon switch arm 36 returns to its central position and contact 38 separates from contact 40 to deenergize field winding 76. The parts now remain in this new position so long as this new temperature persists.

If the temperature to which the thermostat 13 responds should rise still further, the action above described will be repeated and the valve 10 will thus be more widely opened as the controlling temperature increases until such time as the crank pin 91 engages switch arm 78 to move the same from engagement with switch arm 79. The apparatus has then reached its limit of motion in this direction and no further valve opening movement may be imparted thereto.

Whenever the temperature to which thermostat 13 responds falls, the pressure within the bellows 14 decreases and the balancing spring 92 and main operating spring 19 are thereby enabled to move the right hand end of control arm 17 downwardly. Switch arm 21 therefore moves to the right. When this decrease in temperature has been sufficient, contact 22 engages contact 24 whereupon relay coil 31 is short-circuited so that relay coil 30 is operatively energized. Switch arm 36 is therefore moved to the right and the prong 56 engages the left side of switch arm 21 slightly before contacts 37 and 39 engage so that contact 22 is forcibly held in engagement with contact 24. Contacts 37 and 39 are also firmly held together under the action of relay coil 30. This engagement of contacts 37 and 39 energizes field winding 77 by the circuit heretofore described and the main operating shaft 70 is thereupon rotated in a clockwise direction, as viewed from the right. This clockwise rotation of main operating shaft 70 causes movement of valve 10 in closing direction and also causes crank pin 91 to move downwardly. Part of the tension on the balancing spring 92 is thereby relieved so that the pressure in the thermostat 13 becomes effective to move control arm 17 back to its horizontal position wherein switch arm 21 is operated to separate contacts 22 and 24. Separation of these contacts removes the short-circuit around the relay coil 31 so that relay coils 30 and 31 are again equally energized. Contact 37 thereupon separates from contact 39 and the field winding 77 is deenergized.

Further decrease in the temperature to which the thermostat 13 responds is accompanied by similar closing movements of the valve 10 and these movements may continue until such time as the crank pin 91 engages the limit switch arm 80 and moves the same out of contact with the cooperating switch arm 81.

The flexibility of the switch arms 21 and 36 permits the fork 55 to push contact 22 or 23, as the case may be, into engagement with contact 24 or 25 and still permit of good contact pressure between contacts 37 and 39 or contacts 38 and 40. Similarly, when the control arm 17 returns to its central position, the flexibility of these arms permits the separation of contacts 22 and 24 or contacts 23 and 25 in spite of the fact that fork 55 is tending to hold such contacts in engagement.

From the foregoing, it will be apparent that by this invention I have provided a novel follow-up means in a graduated control system wherein the follow-up action is carried back to the primary controller instead of some of the intermediate devices. Further, I have provided a novel manner of obtaining an increase in contact pressure between open contacts in a graduated control system which has novelty irrespective of the manner in which the follow-up or balancing is effected. It will be readily apparent that many changes may be made in the details of construction and arrangement of the parts and I am therefore to be limited only by the scope of the appended claims.

I claim as my invention:

1. In a control system, in combination, a control member, a device to be positioned, electric motor means in control of said device, a switch in control of said motor means, electromagnetic means in control of said switch, a second switch in control of said electromagnetic means and controlled by the conjoint action of the motor means and said control member, and connections between said electromagnetic means and second switch by which the electromagnetic means increases the contact pressure of said second switch.

2. In combination, a control member, a device to be positioned, reversible electric motor means in control of said device, a double circuit switching means in control of said motor means, electromagnetic means in control of said switching means, a switch in control of said electromagnetic means and controlled by the conjoint action of said motor means and control member, and connections between said electromagnetic means and switch by which the electromagnetic means operates upon said switch to increase the pressure between the contacts thereof.

3. In combination, a device to be controlled, a control member, electric motor means in control of said device, a switch in control of said motor means, a pair of electromagnetic coils in control of said switch, a double circuit switching mechanism comprising a switch arm and a pair of cooperating contacts in control of said coils and operable to selectively operably energize one or the other of said coils, connections by which said switching mechanism is operated by the conjoint action of said control member and motor means, and connections between said switching mechanism and coils by which operable energization of either of said coils causes the controlling portion of the switching mechanism to be held more firmly in closed circuit position.

4. In combination, a device to be positioned, reversible electric motor means having first and second circuits in control thereof, a double circuit switching mechanism in control of said circuits, a pair of electromagnetic coils in control of said switching mechanism, switching means comprising a switch arm and a pair of cooperating contacts in control of said electromagnetic coils for selectively operatively energizing the same, said coils being operable to increase the pressure between said switch arm and either of its contacts upon engagement of the switch arm with either of them, a control member, and connections by which the control member and motor means conjointly control the operation of said switching means.

5. In combination, a device to be positioned, double circuit electric motor means in control thereof, a pair of oppositely acting electromagnetic coils connected in series across a source of power, a single armature controlled by said coils, double circuit control switching means operable to shunt one or the other of said coils, a second double circuit switching means in control of said motor means, mechanical connections between said armature and both of said switching means, a control member, and mechanical connections between said control member, motor means and first switching means.

6. In a pressure operated control system, in combination, a control arm having a normal position, a source of variable pressure operative upon increase thereof to move said arm in one direction, a variable opposing force operating to move said arm in the opposite direction, electric motor means in control of said opposing force, a device to be positioned also controlled by said motor means, a switch in control of said motor means, electromagnetic means in control of said switch, and a second switch in control of said first switch and controlled by said arm, said electromagnetic means also acting upon said second switch.

7. In a proportioning control system, in combination, a control arm, a variable controlling force operating to move said arm in one direction, a variable balancing force operating to move said arm in the other direction, double circuit reversible motor means in control of said balancing force, a device to be positioned as a result of changes in value of said controlling force controlled by said motor means, a double circuit switching mechanism in control of said motor means, electromagnetic means in control of said switching mechanism, and switching means controlled by said arm in control of said electromagnetic means, said electromagnetic means also operating upon its controlling switching means.

8. In a proportioning control system, in combination, a control arm, a variable controlling force operating to move said arm in one direction, a variable balancing force operating to move said arm in the other direction, double circuit reversible motor means in control of said balancing force, a device to be positioned as a result of changes in value of said controlling force controlled by said motor means, a double circuit switching mechanism in control of said motor means, double coil electromagnetic means in control of said switching mechanism, and switching means in control of said electromagnetic means, said electromagnetic means being arranged to act upon its controlling switching means.

9. In a follow-up system, in combination, a device to be positioned, motor means in control thereof, a control member, a switch in control of said motor means, electromagnetic means, a second switch in control of said electromagnetic means controlled by the conjoint action of said motor means and control member, and means controlled by said electromagnetic means operable to hold said second switch closed and to close said first switch.

10. In a follow-up system, in combination, a device to be positioned, motor means in control thereof, a control member, a switch in control of said motor means, electromagnetic means, a second switch in control of said electromagnetic means controlled by the conjoint action of said motor means and control member, and a flexible arm controlled by said electromagnetic means arranged to first engage said second switch to securely hold the same closed and then to close said first switch.

11. In a graduated control system, in combination, a device to be positioned, an electric motor in control thereof, a switch which energizes said motor when closed, an electromagnetic coil, a control member, a second switch that is closed and opened by the conjoint action of said motor means and control member, circuit connections between said second switch and electromagnetic coil to operatively energize the latter upon closure of said second switch, and mechanical means operated by said coil when operatively energized, operative to hold said second switch securely closed and to close said first switch.

LEWIS L. CUNNINGHAM.